Patented July 24, 1934

UNITED STATES PATENT OFFICE 1,967,275

1,967,275

IMPREGNATING POROUS OBJECT

Ira Williams, Wilmington, Del., assignor to E. I. du Pont de Nemours & Company, Wilmington, Del., a corporation of Delaware No Drawing. Application May 21, 1931, Serial No. 539,139

14 Claims. (Cl. 91—68)

This invention relates to the treatment of porous objects and more particularly to the impregnation of porous objects with synthetic rubber-like products obtained by the polymerization of chloro-2-butadiene-1,3.

The preparation of chloro-2-butadiene-1,3 has been disclosed in an application of Carothers and Collins, Serial No. 490,538, filed October 22, 1930. It has also been disclosed in an application of Carothers and Collins, Serial No. 519,243, filed February 28, 1931, that when chloro-2-butadiene-1,3 having the formula $CH_2$—$CCl$—$CH$=$CH_2$ is polymerized under ordinary conditions an exceedingly strong elastic rubber-like material is produced. This material strikingly resembles cured rubber in its properties.

An object of this invention is to provide a means whereby porous objects may be filled to any desired extent with this artificial rubber. A further object of this invention is to render porous objects more resistant to the passage of water or gas. A still further object is to render porous objects more resistant chemically.

With these objects in view it has been discovered that chloro-2-butadiene-1,3, which is a thin liquid resembling benzene in appearance and boiling at about 61° C., rapidly penetrates such objects as wood, leather, paper, cloth, bricks and other porous material having openings too small to permit the penetration of natural rubber either in the form of cement or latex. When such porous objects are impregnated and evaporation, for example, prevented by placing the object in a closed vessel in an atmosphere saturated with chloro-2-butadiene-1,3, polymerization slowly takes place and artificial rubber is produced throughout the porous body.

The porous object to be impregnated may be treated either with chlor-diene alone or with chlor-diene which is diluted with suitable solvents. Among the solvents which may be used as diluents are methyl alcohol, ethyl alcohol, acetone, benzene, toluene, carbon disulfide, carbon tetrachloride, and chloroform. Other liquids which do not prevent the polymerization of chlor-diene are suitable. Liquids which retard the polymerization of chlor-diene such as the amines and phenolic bodies, although they may be employed, are less well suited to serve as diluents.

The impregnation of the porous object may generally be accomplished simply by dipping in the impregnating liquid. In case the porous object is penetrated only with difficulty any of the known means for effecting impregnation may be used. Thus pressure may be applied or the object may be subjected to a vacuum followed by pressure.

Due to the low boiling point of chloro-2-butadiene-1,3, care must be taken that the liquid which penetrates the porous body be held in place until it is polymerized. This may be accomplished either by placing the impregnated object in a close fitting mold or by placing it in a chamber saturated with the liquids used for impregnation.

The amount of artificial rubber present in the finished product is, of course, controlled by the amount of chlor-diene used and the state of polymerization before the liquid is permitted to evaporate. When only small amounts of artificial rubber are required the chlor-diene may be proportionately diluted with a suitable solvent or the excess liquid allowed to evaporate. When the maximum amount of rubber is desired, undiluted chlor-diene should be used and the porous object should be exposed to the open air only after polymerization is complete.

The following examples are intended to illustrate some of the methods by which the present invention may be applied.

Example 1

A piece of kid leather weighing 20 grams was dipped in a mixture of 50 grams of chloro-2-butadiene-1,3, 50 grams of benzene and 1 gram of turpentine. It was then closely wrapped in tin foil to prevent evaporation and permitted to polymerize for six days. After evaporation of the remaining volatile liquids the leather was found to weigh 28 grams. The leather which was originally light yellow was slightly darker in color and was considerably more firm and waterproof.

Example 2

A piece of light yellow kid leather weighing 45 grams was dipped in chlor-diene containing 1% of benzoyl peroxide. It was then closely wrapped in tin foil and permitted to polymerize for 10 days. After evaporation of the remaining volatile liquid the leather weighed 92 grams. The leather was brown in color, semi-transparent and entirely waterproof.

Example 3

A block of soft pine weighing 147 grams was dried and placed in a chamber which was evacuated. Chloro-2-butadiene-1,3 containing benzoyl peroxide was then run in to cover the block. The pressure was then released and the saturated block was placed in a closed vessel containing chlor-diene. After six days the block was dried and found to weigh 162 grams. The wood was less porous and much more resistant to penetration by water than the untreated sample.

Example 4

A strip of white broadcloth was made into a roll and dipped in chloro-2-butadiene-1,3 containing 1% of air blown turpentine. The roll of cloth was then closely wrapped in tin foil and permitted to polymerize for 6 days. At the end of this time the cloth was unrolled and dried. The rubber was distinctly visible and the cloth was quite waterproof.

*Example 5*

A block of porous tile weighing 92 grams was saturated with chloro-2-butadiene-1,3 and placed in a closed container containing a small amount of liquid chloro-2-butadiene-1,3. After ten days the tile was found to have increased in weight 27 grams when all the unpolymerized chlor-diene had evaporated. The porosity had been overcome to such an extent that the tile could not be penetrated by liquids.

As is evident from the above examples, polymerizing catalysts such as benzoyl peroxide and the peroxides of lead, sodium and hydrogen and oxidized turpentine may be employed to accelerate the polymerization or the impregnation and polymerization may be carried out at increased pressure in order to increase the impregnation and accelerate the polymerization.

It will be understood, however, that the process is susceptible to numerous modifications and variations and that the examples are presented for purposes of illustration only. Thus, the polymerization may be accelerated by carrying out the process at temperatures above normal or controlled by the presence of inhibitors in the chloro-2-butadiene-1,3, as disclosed in the application of Carothers, Collins and Kirby, Serial No. 519,241, filed February 28, 1931. Moreover, various non-volatile materials such as rosin, oils, and waxes may be incorporated with the chloro-2-butadiene-1,3 prior to impregnation in suitable amounts, provided they do not function to prevent the subsequent polymerization or to reduce the penetrating qualities of the chloro-2-butadiene-1,3 to such an extent as to make it unsuitable for use as an impregnating agent. Other polymerizable substances such as the unsaturated hydrocarbons may likewise be incorporated with the chloro-2-butadiene-1,3 prior to impregnation. The polymerization of chloro-2-butadiene-1,3 in admixture with various solvents is fully disclosed in Carothers, Collins and Kirby, Serial No. 519,242, filed February 28, 1931.

There are many new and novel uses to which this invention may be applied. For example, porous objects such as ceramics, cement, wood, cloth, rope, leather and paper may be rendered more resistant to the penetration of gases and liquids. Materials may be mechanically strengthened by being more firmly bonded. For example, low grade leather may be made quite firm by impregnation with chlor-diene followed by polymerization. The fibers contained in rope or cloth or paper may be bonded more closely together by the process of this invention.

Although the invention has been described above with particular reference to chloro-2-butadiene-1,3, it will be obvious that other related hydrohalogen addition products of vinylacetylene may be similarly employed. Thus, bromobutadiene-1,3 or the corresponding iodine compound may be used as the impregnating agent and allowed to polymerize under substantially the same conditions which characterize the polymerization of the chloro product.

As many apparent and widely different embodiments of this invention may be made without departing from the spirit and scope thereof, it is to be understood that I do not limit myself to the specific embodiments thereof except as defined in the appended claims.

I claim:

1. The process of producing an article of manufacture which comprises impregnating a porous material with chloro-2-butadiene-1,3 and allowing the chloro-2-butadiene-1,3 to polymerize.

2. The process of producing an article of manufacture which comprises impregnating a porous material with chloro-2-butadiene-1,3 and allowing the chloro-2-butadiene-1,3 to polymerize under conditions adapted to prevent substantial evaporation.

3. The process of producing an article of manufacture which comprises impregnating a porous material with a chloro-2-butadiene-1,3 solution and allowing the chloro-2-butadiene-1,3 to polymerize.

4. The process of claim 3 wherein the chloro-2-butadiene-1,3 is dissolved in a volatile inert solvent and the polymerization takes place under conditions adapted to prevent substantial evaporation.

5. The process of producing an article of manufacture which comprises impregnating a porous material with chloro-2-butadiene-1,3 containing a polymerizing catalyst and allowing the chloro-2-butadiene-1,3 to polymerize.

6. The process of claim 5 wherein the catalyst is an oxidizing agent of the class consisting of benzoyl peroxide and oxidized turpentine and the chloro-2-butadiene-1,3 is polymerized under conditions adapted to prevent substantial evaporation.

7. A porous object impregnated with a chloro-2-butadiene-1,3 polymer, the porous object having been first impregnated with chloro-2-butadiene-1,3 and the chloro-2-butadiene-1,3 thereafter polymerized in situ.

8. A porous object contaning in the interstices thereof a tough, elastic synthetic rubber-like chloro-2-butadiene-1,3 polymer, the porous object having been first impregnated with chloro-2-butadiene-1,3 and the chloro-2-butadiene-1,3 thereafter polymerized in situ.

9. Leather impregnated with a polymer of chloro-2-butadiene-1,3.

10. Textile material impregnated with a chloro-2-butadiene-1,3 polymer, the textile material having been first impregnated with chloro-2-butadiene-1,3 and the chloro-2-butadiene-1,3 thereafter polymerized in situ.

11. A porous ceramic material impregnated with a chloro-2-butadiene-1,3 polymer.

12. The process of producing an article of manufacture which comprises impregnating a porous material with a hydrohalogen addition product of monovinylacetylene and allowing the hydrohalogen addition product to polymerize.

13. A porous object containing in its pores a polymer of a hydrohalogen addition product of monovinylacetylene, the porous object having been first impregnated with the hydrohalogen addition product and said addition product thereafter polymerized in situ.

14. The process of rendering a porous body resistant to the passage of water or gas which comprises impregnating said body with chloro-2-butadiene-1,3 in liquid form and then allowing the chloro-2-butadiene-1,3 to polymerize to produce, within the pores of said body, a material resembling vulcanized rubber.

IRA WILLIAMS.